June 18, 1968 R. L. JAESCHKE 3,389,278
DYNAMOELECTRIC MACHINES
Filed Dec. 28, 1965 6 Sheets-Sheet 1

Ralph L. Jaeschke,
Inventor.
Koenig, Senniger, Powers and Leavitt,
Attorneys.

FIG.6.
FIG.5.
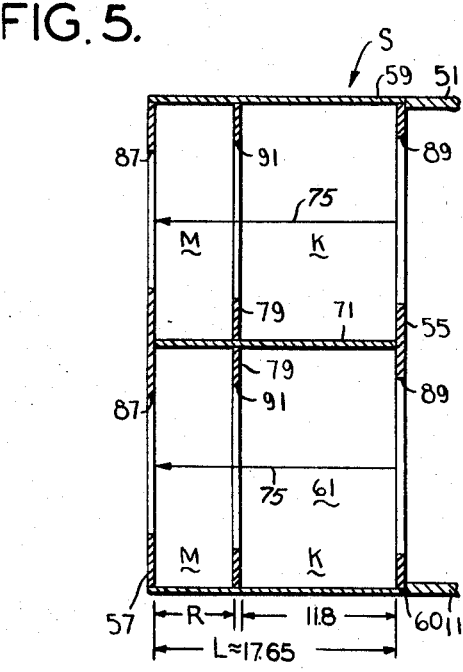
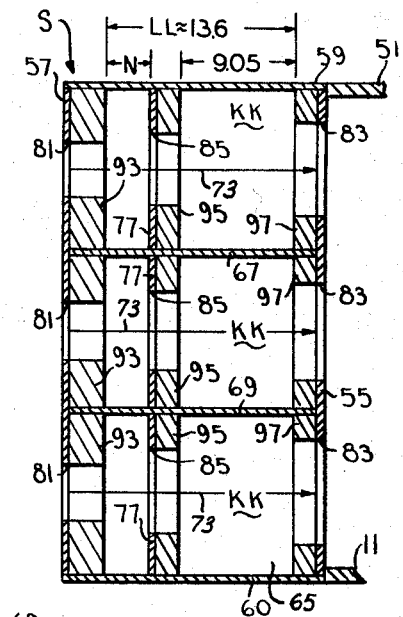
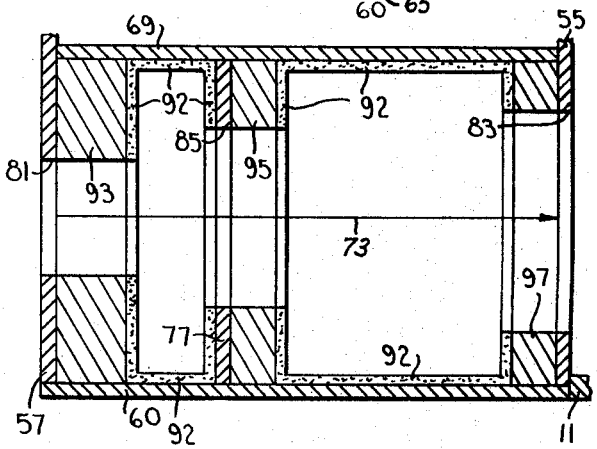
FIG.6A.

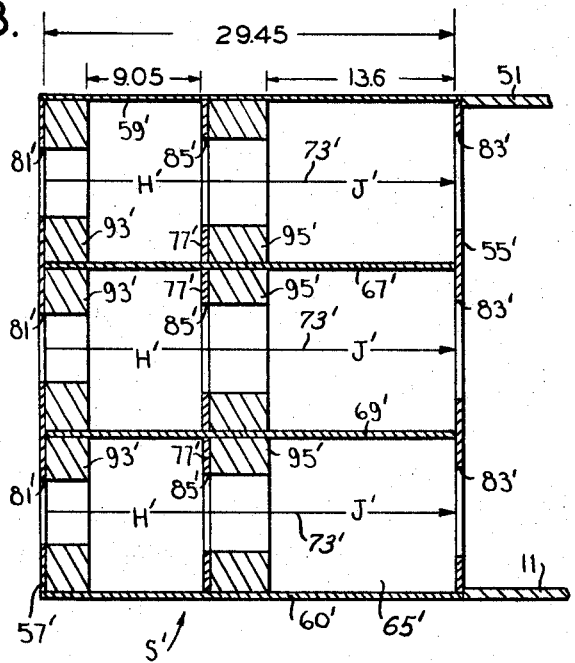
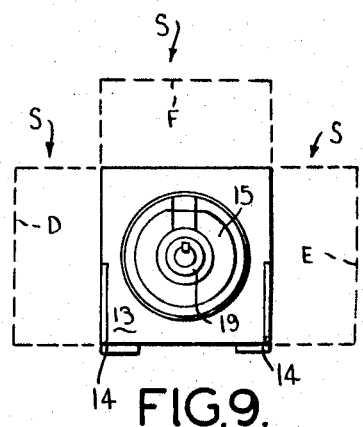
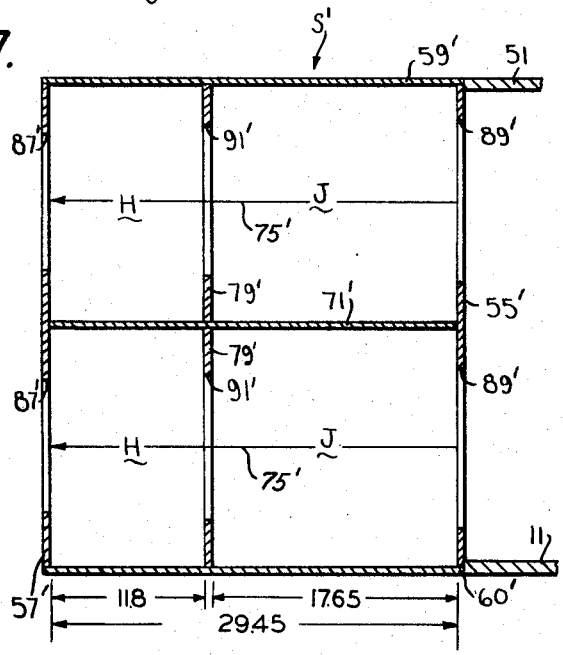

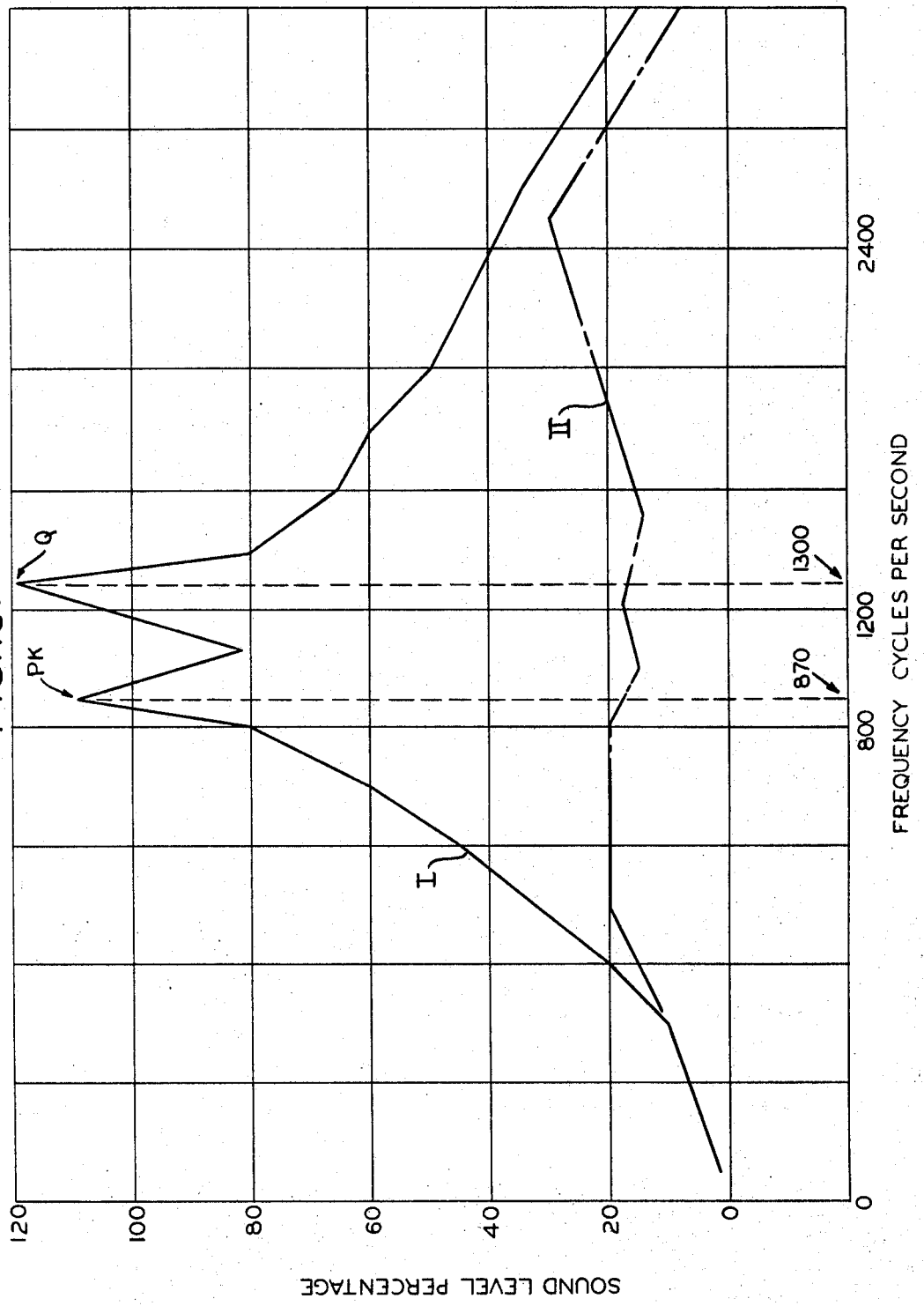

United States Patent Office 3,389,278
Patented June 18, 1968

3,389,278
DYNAMOELECTRIC MACHINES
Ralph L. Jaeschke, Kenosha, Wis., assignor to Eaton Yale
  & Towne Inc., a corporation of Ohio
Continuation-in-part of application Ser. No. 456,094,
  May 17, 1965. This application Dec. 28, 1965, Ser.
  No. 528,675
28 Claims. (Cl. 310—105)

ABSTRACT OF THE DISCLOSURE

Assemblies are disclosed for suppressing sound generated by the relatively rotary members of air or gas-cooled dynamoelectric machines, such as motors and dynamometers. The assembly is constituted by a housing with one or more air inlet passages connected to one or more air inlet openings of the machine. The housing also includes one or more air outlet passages connected to one or more air outlet openings of the machine. Each inlet and outlet passage is provided with a cross wall positioned transversely to the direction of air flow and has an aperture smaller than the respective air inlet and outlet openings. These cross walls are positioned in the passages in a direction away from the openings and at a distance substantially equal to a wavelength function of the characteristic frequency of the sound in the air circulating through the respective passages. Sound suppressors having more than one apertured cross wall are described for effecting substantial cancellation of sound of more than one characteristic frequency.

---

This application is a continuation-in-part of my co-pending U.S. patent application Ser. No. 456,094, filed May 17, 1965, and now abandoned, for Electromagnetic Induction Apparatus Including Sound Suppressor Means.

This invention relates to dynamoelectric machines, and more particularly to such machines comprising rotary electromagnetic induction apparatus and sound suppression means therefor.

Among the several objects of the invention may be noted the provision of sound suppressor means in connection with electromagnetic induction apparatus, the latter being cooled by air or other gas, said suppressor means being particularly effective when several energy peaks of sound resulting in noise are to be suppressed; the provision of efficiently cooled electromagnetic induction apparatus having such sound suppressor means compactly forming a part thereof; the provision of apparatus of the class described which is so constructed that its parts may be flexibly arranged for various conditions at the point of use; and the provision of low-cost sound suppressor means per se. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are illustrated.

Figure 1:
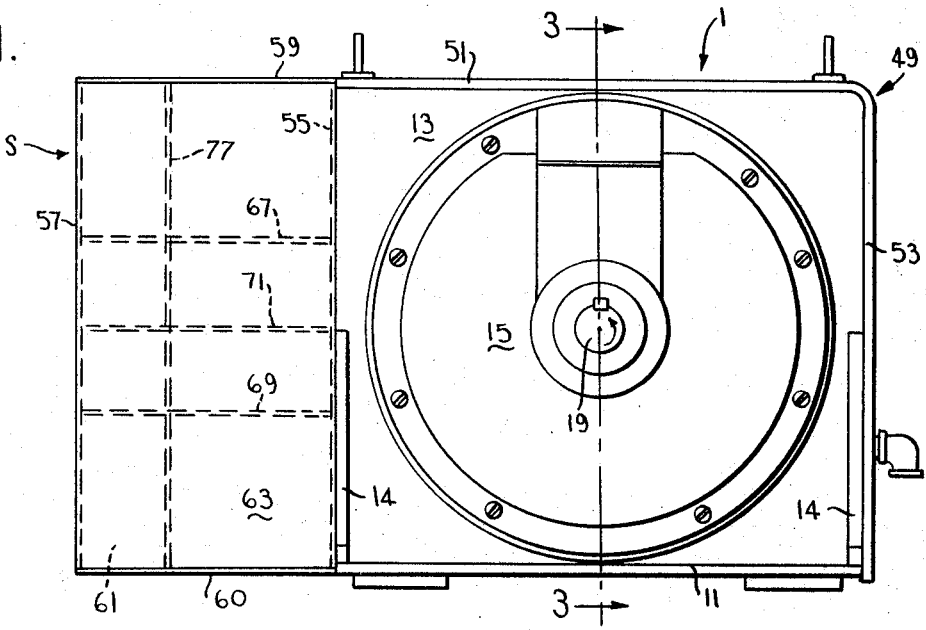
FIG. 1 is an end elevation of an air-cooled eddy-current coupling illustrating the invention.
Figure 2:
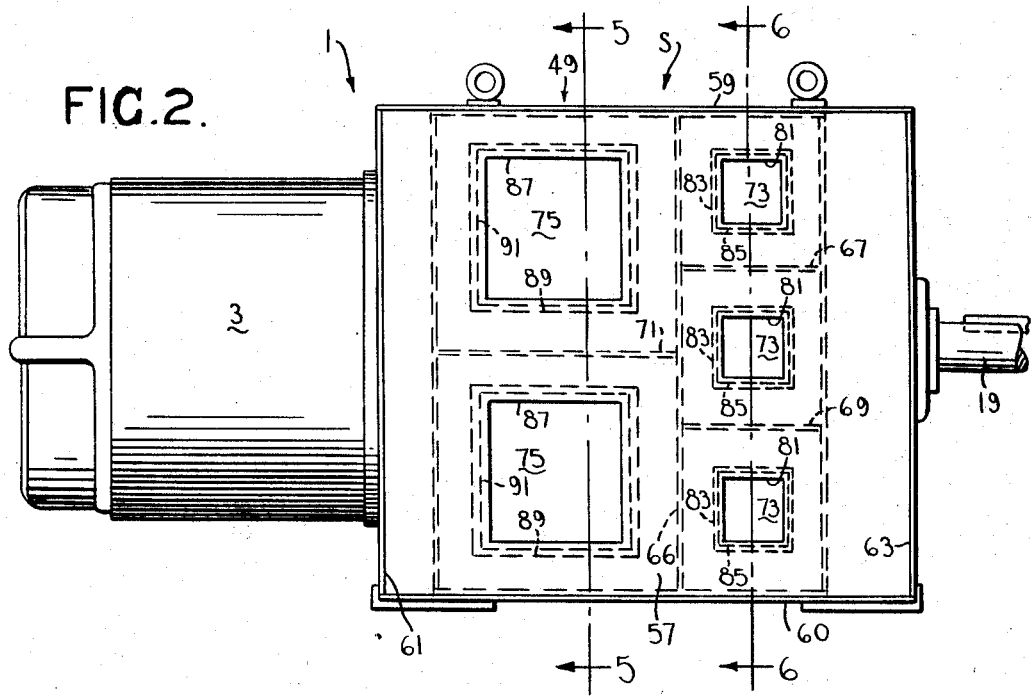
FIG. 2 is a left side view of FIG. 1.
Figure 11:
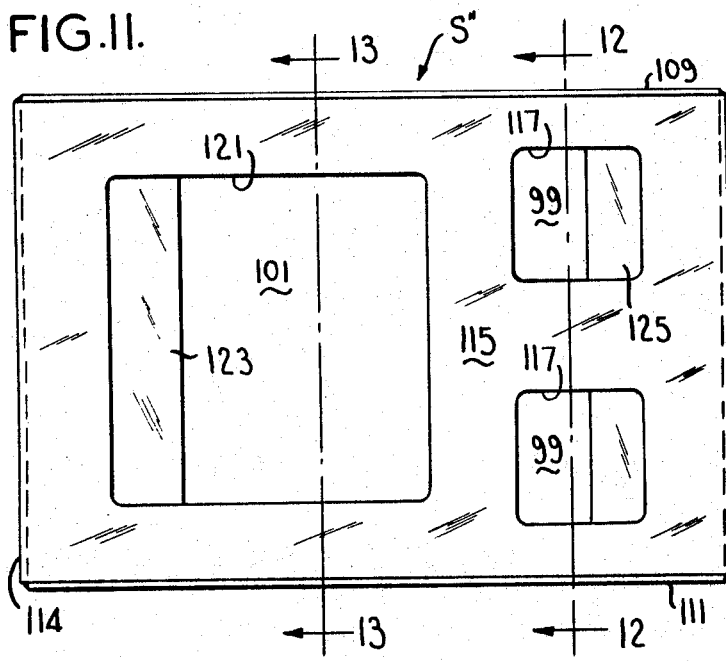
Figure 12:
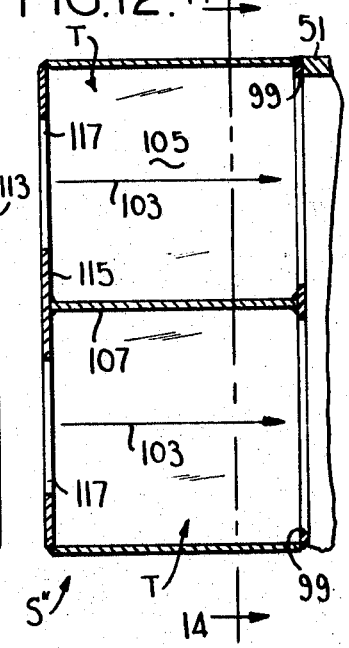
Figure 14:
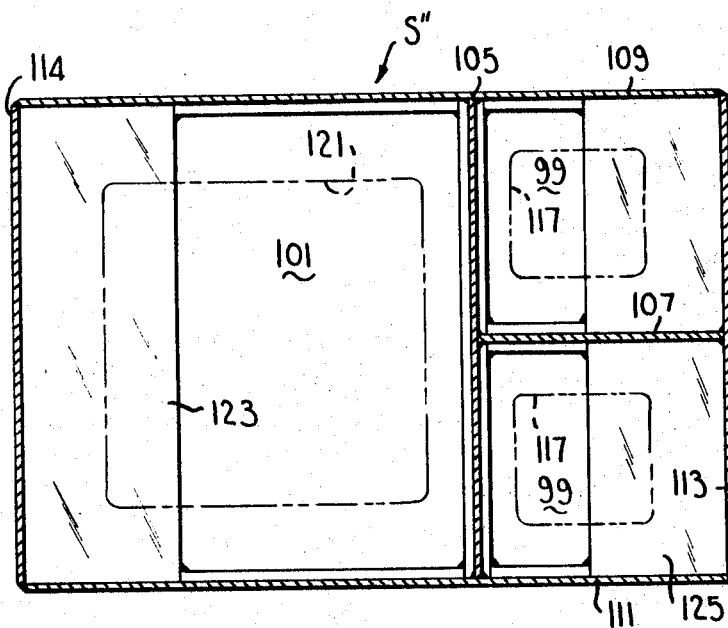
Figure 13:
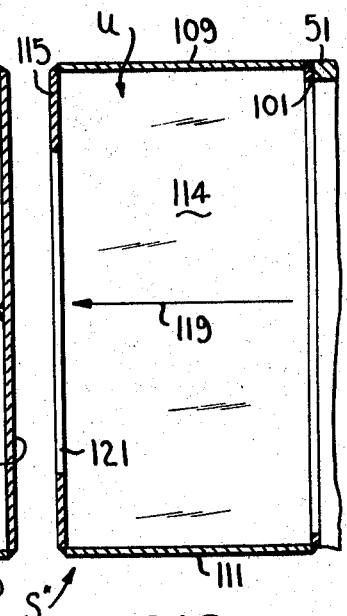

FIGS. 5 and 6 are vertical sections taken on lines 5—5 and 6—6, respectively, of FIG. 2, showing a preferred shallow form of sound suppressor means;

FIG. 6A is an enlarged fragmentary view of the lower part of FIG. 6, illustrating the use, if desired, of acoustical lining material;

FIGS. 7 and 8 are views similar to FIGS. 5 and 6, respectively, showing an alternative long form of sound suppressor means;

FIG. 9 is a small-scale, diagrammatic end view like FIG. 1, illustrating by dotted lines various modes of attachment to induction apparatus of the sound suppressor means;

FIG. 10 is a substantially logarithmic chart showing typical improvements brought about by means of the invention;

FIG. 11 is a side elevation of another embodiment of a sound suppressor assembly of this invention;

FIGS. 12 and 13 are vertical sections taken on lines 12—12 and 13—13 of FIG. 11; and FIG. 14 is a vertical section on lines 14—14 of FIG. 12 showing portions of the assembly in phantom.

Corresponding reference characters illustrate corresponding parts throughout the several views of the drawings.

The term electromagnetic induction apparatus as used herein is intended to include electromagnetic induction couplings such as illustrated, motors, dynamometers, etc., which have two relatively rotary members which generate heat during relative rotation, and which employ air or other suitable gas as a coolant. The terms air and gas are to be taken herein as synonymous.

In view of water shortages and cost, it has become the practice to employ air or gas rather than water or other costly liquid coolant for the cooling of induction apparatus of the types above-mentioned, particularly in those cases wherein the apparatus is of high capacity and in which substantial amounts of heat are generated and are required to be dissipated and carried off. The air-driving fin arrangements for high-capacity performance produce a high sound level which often has peaks at one or more different frequencies. The result is a high level of what is generally referred to as noise, which is of a disagreeable nature, so much so that in many instances it becomes intolerable in locations where the machines are installed. This has resulted in the problem of incorporating a substantially effective, compact sound suppressor which may be constructed economically and which will meet demands at various locations in the field. The present invention effectively solves these and connected problems.

Figure 3:
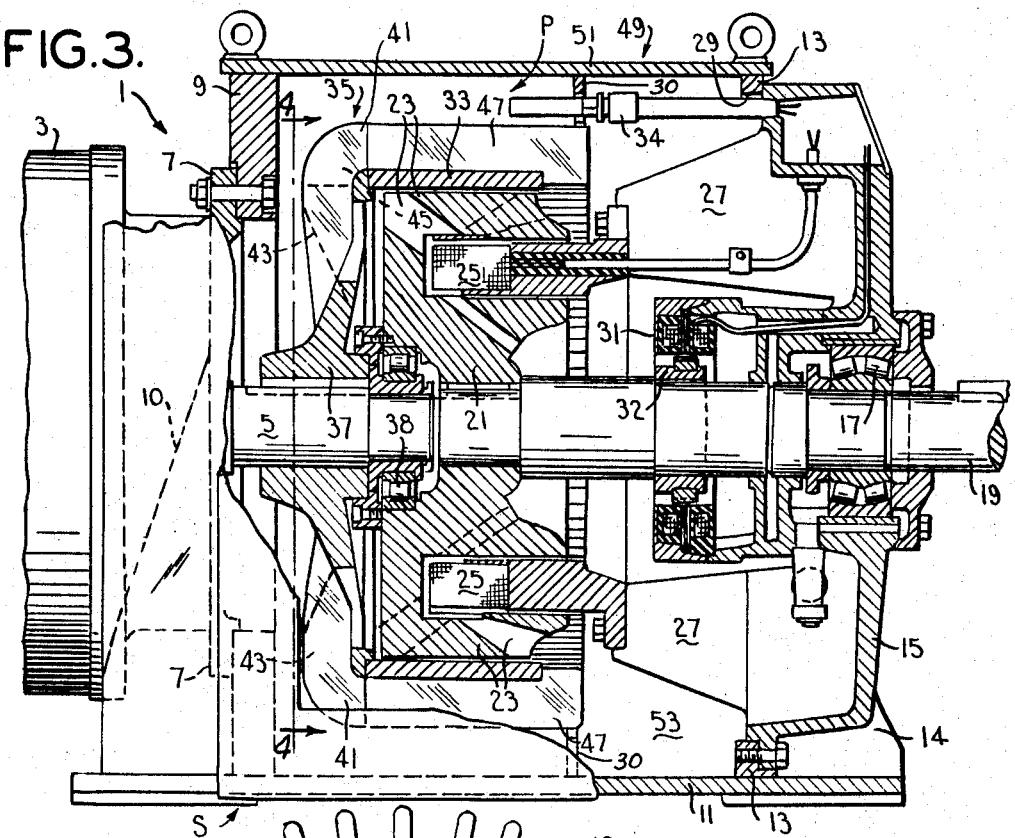
FIG. 3 is an enlarged partial section viewed on line 3—3 of FIG. 1, showing air-cooled electromagnetic coupling means.

Referring now more particularly to FIGS. 1–4, numeral 1 indicates a typical eddy-current electromagnetic induction coupling. Such a coupling includes a substantially constant-speed driving motor 3 having a drive shaft 5 (FIGS. 2 and 3). The flange 7 of the motor is bolted to an upright rectangular end wall 9, supported near one end of a base 11. The shaft 5 is supported on the usual bearings located in the motor casing. Carried near the other end of the base 11 is a second rectangular end wall 13 which supports an end bell 15. The end bell is a bearing 17 for a driven shaft 19. Wall 9 is braced by stiffening flange means 10 extending from base 11, and wall 13 by stiffening flange means 14 extending from the base.

The driven shaft 19 carries a polar field member 21 having interdigitated pole-forming teeth 23 excited by a stationary field coil 25. Coil 25 is carried on brackets 27 extending from the end bell 15. The end wall 13 has an opening 29 for accommodating insertion of the brackets 27 and other parts. The end bell 15 also carries stator 31 of a tachometer control generator, the rotor 32 of which is carried by shaft 19. The stator 31 is wired in the usual way to control the field strength of the electromagnetic coil 25. Thus the polar field strength of the polar field member 21 controls the speed of shaft 19. The speed of shaft 5 is substantially constant. An air-temperature sensor 34 is also carried on the end bell 15 and extends interiorly through the opening 29 and a peripheral air baffle 30.

Surrounding the field poles 23 is a ferromagnetic eddy-current inductor drum 33. This is welded to and supported by a rotary spider 35 (FIG. 4), having a hub 37 keyed to the shaft 5 (FIG. 3). A pilot bearing 38 is provided between the end of the shaft 5 and the polar field member 21, thus forming an end support for the driven shaft 19 and the field member 21.

Figure 4:
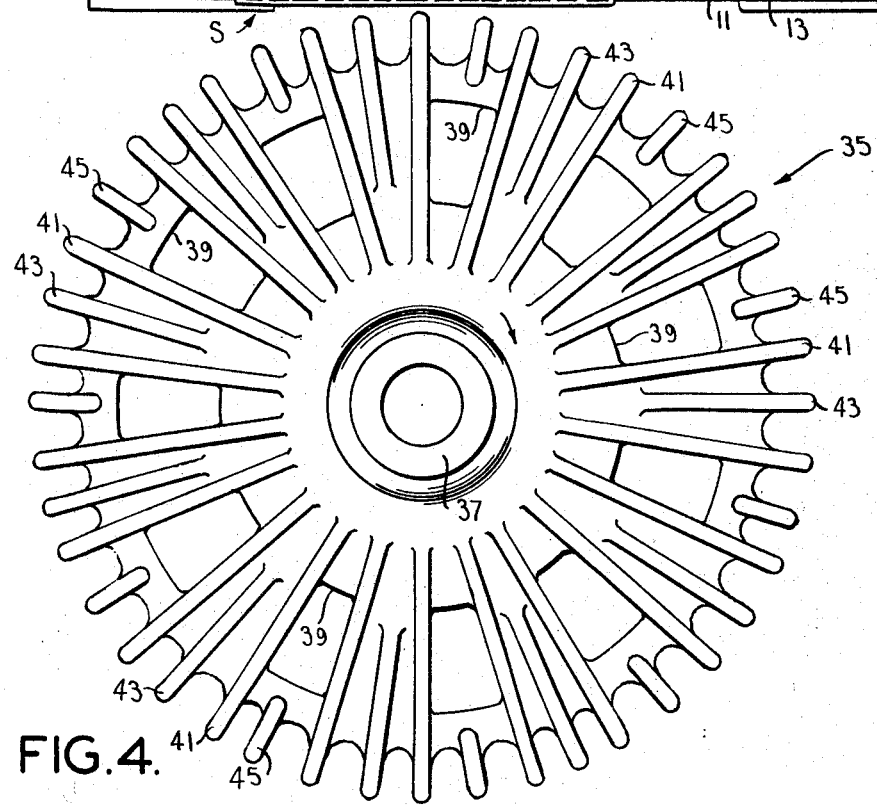
FIG. 4 is a vertical section taken on line 4—4 of FIG. 3, showing air-circulating means.

FIG. 4 shows an end view of the spider 35 which will be seen to include a number of openings, flanked by pairs of long fins 41. Shorter fins 43 are provided between the pairs of fins 41 where no openings 39 exist. Outside of the openings 39 are located still shorter fins 45. The spacings between each fin 41 and the adjacent fins 43 and 45 are unequal. All of the fins 41, 43 and 45 are curved to extend from a radial direction to an axial direction. In the latter direction they abut aligned, axially disposed fins 47 on and extending from the inductor drum 33, as shown in FIG. 3.

When the motor 3 drives the drum 33 and the coil 25 is excited, an electromagnetic coupling effect is established into the known manner between the drum and the polar field member 21. The speed of the driven shaft 19 is a function of the excitation of the coil 25, the slip speed between the drum 33 and the polarizing teeth 23 resulting in the production of eddy currents in the inductor drum 33. These generate a magnetic field which reacts with the polar fields from the poles 23 to transmit torque between shafts 5 and 19.

The eddy currents generate a considerable amount of heat in drum 33, which must be carried away by the large current of air produced by the fins 41, 43, 45 and 47. The openings 39 and the variable angular spacings shown for the fins in FIG. 4 are designed for large air flow but the variable spacing produces sound which has at least one or more different characteristic frequencies or frequency peaks and which causes an undesirable high-energy noise effect. A typical condition of this nature is illustrated in FIG. 10, in which line I plots the percentage sound level (in decibels) against frequency in cycles per second (c.p.s.). This line I shows peaks at PK and Q correspond to the frequencies of 870 c.p.s. and 1300 c.p.s., respectively. Line II shows the improvement effected by means of the invention. This shows not only that the sound level is generally reduced, but that the two particularly obnoxious frequency peaks PK and Q, responsible for the more intolerable noise-forming components of the sound, are practically eliminated. The reason for this is the use in connection with the apparatus of the sound suppressor assembly described below.

In order to accommodate and transmit the substantial volume of air which is circulated for cooling, I provide an extensive enclosure or rectangular plenum chamber P around the rotating parts. This may be formed by a reversible L-shaped housing part 49 connecting the rectangular end walls 9 and 13. The L-shaped part 49 forms a top 51 and one side 53 of the chamber P. Thus the chamber P is formed on five sides by the base 11, closed end walls 9 and 13, the flat top 51, and its flat side wall 53. The sixth side may thus be open before the sound suppressor assembly or box, to be described and lettered S, is attached. When the assembly or box S is attached, this open side becomes covered by the inner side of the box. Attachment is accomplished by any suitable means such as welding, bolting or the like. The suppressor box S carries the air inlet and outlet sound-suppressing means to be described.

Depending upon where the machine is to be located, it may be desirable to have air inlet and outlet means on one side or another of the machine, or it may even be desirable to have such means on top (see the dotted lines D, E and F of FIG. 9, showing alternative locations for box S). Which of these locatioins of suppressor S is to be employed depends upon the desires of a customer, whether on the left, right or top side of the apparatus. To attach suppressor box S on the left side of plenum chamber P as shown in FIG. 1 (and at D in FIG. 9), the L-shaped part 49 will be set up on the right side. To position the suppressor box S on the right side of the plenum chamber P, as shown at E on FIG. 9, involves merely reversal of the position on end walls 9 and 13 of the L-shaped member 49. For top mountnig of box S, the top wall 51 may be omitted and two side walls such as 53 employed, one on each of the left and right sides of the machine.

Briefly, then, the rectangular plenum chamber P has five enclosing walls, the sixth being provided by the attached rectangular suppressor box S. Thus there is provided, on whatever is chosen as an open side of the plenum chamber P, an attached enclosing sound suppressor assembly S, through which inlet air is drawn and outlet air is expelled, in the manner explained below.

The sound suppressor box S has an inner wall 55, an outer or crosswall 57, a top 59, a bottom 60, and side walls 61 and 63 (FIGS. 1, 2, 5 and 6). It is divided interiorly by a vertical partition 66 and transverse shelves 67, 69 and 71, thereby forming three comparatively small rectangular air inlet passages 73 and two rectangular larger air outlet passages 75. Vertical cross walls 77 divide each of the inlet passages 73 into chambers MM and KK while vertical cross walls 79 divide each of the outlet passages 75 into chambers M and K. Each of the air inlet passages 73 has a comparatively small aperture or opening 81 at its outer end in wall 57, a comparatively large outlet opening 83 into enclosure P at its inner end in wall 55, and an opening 85 of intermediate size in its dividing cross wall 77 (FIG. 6). Each of the air outlet passages 75 likewise has a comparatively small aperture or opening 87 at an outer end, a comparatively large air inlet opening 89 from enclosure P at its inner end, and an opening 91 of intermediate size in its cross wall 79 (FIG. 5). The cross-sectional areas of the outlet passages 75, including the openings 87, 91 and 89, are larger than those of the inlet passages 73, including the openings 81, 85 and 83, because the former carry expanded warmer air.

The box S, its dividing walls, and the openings 81, 83, 85, 87, 89 and 91 are preferably all rectangular in form as the drawings show, because as such they are more economical to construct than are other shapes (e.g., circular or cylindrical) which may also be used in accordance with this invention. Of importance in any event is that in a given passage the successive openings from the inside to the outside shall decrease in area.

It will be noted from FIG. 2 of the drawings that the marginal portions of each succeeding opening in either passages 73 or 75 lie within the axially projected outline of the opening ahead of it. Thus, starting at the side of the box S on its side adjacent plenum chamber P, for each passage there is a comparatively large opening (outside dotted line). Then moving axially along the passages in a direction away from the enclosure, the next intermediate opening (intermediate dotted line) lies within the projected outline of the first opening, and the outside comparatively small opening (solid lines) lies within the projected outline of the intermediate opening.

Thus as to inlet passages 73 (FIG. 6), each of intermediate openings 85 should preferably be about 5–30% less in area than each of openings 83, and each of openings 81 should preferably be about 5–30% less in area than each of the openings 85; likewise, in the case of outlet passages 75 (FIG. 5), each of the areas of openings 91 should preferably be about 5–30% less than that of each of the openings 89, and the area of each of the outer openings 87 should be about 5–30% less than that of each of the intermediate openings 91. These figures are subject to some variation within the principles of the invention. The purpose of the variation in opening sizes is that the portions around openings 91 and 87 on the one hand, and 85 and 81 on the other hand, shall function to reflect outgoing sound backwardly, so as to have a substantial, if not complete, resonant sound-cancelling effect, to be discussed. In the case of inlet passages 73 (FIG. 6), sound-reflecting wooden or like filler blocks 93, 95 and 97 are employed on the insides of the inlets for purposes which will appear. In FIG. 6A is shown how acoustical lining material 92, such as glass wool, may be used in any or all inlet and outlet passages. Such material tends to absorb sound of higher frequencies, e.g., above about 2000 c.p.s. However, sound absorbent linings are a desirable but not necessary feature for operation according to the invention.

Air is drawn into and through the inlet passages 73, being impelled through the plenum chamber P by the sound-producing, finned rotating spider 35 and inductor drum 33. The air then is driven out through the outlet passages 75. The sound to be suppressed passes out from the plenum chamber P through both passages 73 and 75. Thus the sound is propagated oppositely to the inlet flow of air in inlet passages 73 (FIG. 6) and in the same direction as that of the flow of exhaust air through the outlet passages 75 (FIG. 5).

FIGS. 5 and 6 as above described show preferred forms of the passages 73 and 75, which require only a comparatively shallow form of box S, as shown in FIG. 1. In FIGS. 7 and 8, corresponding but longer passages are employed, requiring a deeper but still useful form of box S'. Numerals used in FIGS. 7 and 8 correspond to those employed for like functioning parts in FIGS. 5 and 6, except that they are primed in FIGS. 7 and 8 because of certain dimensional differences. Operation will be described first by reference to the forms of FIGS. 7 and 8 because explanation as to these forms the basis for making clear certain advantages of the form of sound suppressor assembly S shown in FIGS. 5 and 6.

As to operation (FIGS. 7 and 8), the speed of sound in still air at room temperature is taken herein as being approximately 1129 f.p.s. The speed of air in through the inlet passages 73' and out through the outlet passages 75' is taken to be approximately 150 f.p.s. The algebraic sum of these speeds in each passage 75' is approximately 1279 f.p.s. and in each passage 73' is approximately 979 f.p.s. The velocity ($v$), frequency ($f$) and wavelength ($w$) of sound in air are related by the expression $v/f=w$. The characteristic frequency or sound frequency peak generated by rotary induction apparatus is a function of the rotational speed of the finned or vaned drum 33 and the number of peripheral fins and openings 39. As there are at least two different peripheral spacings between the various fins and two different sized openings 39, as noted above, the sound generated by operation of this apparatus has at least two different characteristic frequencies or frequency peaks as shown in graph I of FIG. 10.

Consider first the higher frequency peak of 1300 c.p.s. at Q in FIG. 10. Substituting values in the above-stated expression and converting to inches, there results $$\frac{1129+150}{1300} \times 12 = 11.8 \text{ inches (wavelength)}$$

The inside dimension between the openings 91' and 87' (i.e., the portions of outlet passages 75' within resonant chambers H) is made to correspond substantially to this wavelength (FIG. 7). Next consider the lower frequency of 870 c.p.s. at PK in FIG. 10. Substituting values in the above expression and converting to inches, there will result $$\frac{1129+150}{870} \times 12 = 17.65 \text{ inches (wavelength)}$$

The inside dimension between openings 89' and 91' (i.e., the portions of the outlet passages 75' within resonant chambers J) is made to correspond substantially to this wavelength (FIG. 7). Thus in effect the outlet passages 75' are divided into chambers H and J, the effective inside lengths of which are approximately 11.8 inches and 17.65 inches, respectively, which is to say, about equal to the wavelengths at the peaks Q and PK in FIG. 10 under the air velocity conditions existing in these chambers. Each chamber H is substantially resonant at the higher characteristic frequency and a standing wave at this characteristic frequency is produced by sound reflection from around its opening 87'. As the reflected wave is effectively substantially 180° out of phase with sound of this frequency peak leaving the enclosure, there is substantial cancellation of sound at or near the 1300 c.p.s. peak Q. In the same fashion, each chamber J resonates at or near the 870 c.p.s. peak PK. In the latter case, sound of this lower frequency reflects from around opening 91' and forms a standing wave in chamber J. As the reflected wave is effectively substantially 180° out of phase with the sound waves of this characteristic frequency generated by coupling 1, there is substantial cancellation of sound of this frequency.

As regards the passages 73' (FIG. 8), the outgoing sound progresses against the inlet flow of air so that the chamber lengths (in this case the chambers are letters H' and J') need to be computed with an air velocity of 1129−150=979 f.p.s. By computations similar to those above given and taking the negative sign into account, there will be obtained an inside length for chamber H' of 9.05 inches and for chamber J' of 13.6 inches. In order that such lengths may be conveniently obtained in the box S', wooden spacers such as shown at 93' and 95' are employed, as shown in FIG. 8. Thus the inside lengths 9.05 inches of chamber H' and 13.6 inches of chamber J' effect substantial resonance at the peaks PK and Q (FIG. 10) under the conditions existing in these air inlet passages. The net sound-suppressing effect of box S' is as shown in FIG. 10, wherein the primary noise-producing peaks are suppressed as shown by curve II relative to curve I. There will also be reflections from the margins around openings 81' and 87' through the entire approximately 30-inch length of each inlet 73' and each outlet 75'. However, as this length does not substantially correspond to a wavelength function of a sound frequency peak generated by this particular coupling, it would have no significant silencing effect. If a third characteristic frequency is produced by the rotary apparatus, sound of this frequency can be sharply attenuated by use of another chamber of the proper length, or it will be attenuated if the combined lengths of H' and J' are approximately a wavelength function of this third sound frequency.

The term wavelength function as used herein refers to one or one-half wavelength, or multiples thereof (under conditions existing in the particular passage of the sound suppressor assembly), of sound of a characteristic frequency to be suppressed. That is, the velocity and temperature of the air significantly affect the propagation velocity of the sound wave relative to the enclosure, and this will change the wavelength. As noted above, one wavelength of sound having a characteristic frequency of 1300 cycles is about 11.8 inches in outlet passage 75', while one wavelength of sound of this same characteristic frequency is about 9.05 inches in inlet passage 73' because the propagation velocity of the sound relative to the apparatus enclosure is assumed by this example to be 300 f.p.s. greater in the air outlet passage than in the air inlet passage. Thus, although these distances of H and H' are quite different, each coresponds to the same wevelength function of the same characteristic frequency of sound in the air circulating through the respective passages.

While as above stated the resonant chambers H, J (FIG. 7) and H', J' (FIG. 8) accomplish the desired results, I have found that the added or extended 30-inch or so lengths of these can be reduced, and consequently the depth of the sound box S' reduced, as shown by box S in FIGS. 1, 5 and 6.

In FIG. 5 the lengthwise chamber dimensions are what may be referred to as coextensive. Thus, the 17.65-inch dimension (which corresponds as noted above to one wavelength of 870 c.p.s. sound in the conditions assumed here to exist, for example, in the air outlet passages) constitutes the full depth of the shallower box S and corresponds to the length of a resonant chamber L which has a length equal to the combined lengths of chambers M and K. Chambers K have a length of 11.8 inches (a full wavelength of sound of a frequency of 1300 c.p.s. in the conditions assumed to exist in this example in the air outlet passages) and resonate at this 1300 c.p.s. frequency peak. The sound-suppressing results are similar but the suppressor box S (FIGS. 1, 5 and 6) is much shallower than suppressor box S' (FIGS. 7 and 8). If desired, chamber M may be utilized instead of, or in addition to, chamber K if the length R of this chamber is made a wavelength function of a sound frequency peak to be suppressed.

Referring now to the preferred shorter forms of the air inlet passages 73 shown in FIG. 6, the length LL from the inner surface of block 93 to the outer surface of block 97 is 13.6 inches and thus corresponds to one wavelength of the sound characteristic frequency of 870 c.p.s. in air circulating in that passage. Similarly, the length of chamber KK is 9.05 inches, which is one wavelength of the 1300 c.p.s. frequency peak in the air circulating in this inlet passage. Thus, the lengths of the resonant chambers LL and KK correspond to the wavelength functions of 13.6 inches and 9.05 inches shown in FIG. 8 except that these dimensions are in a coextensive or folded relationship in FIG. 6, thereby permitting the use of a smaller depth for the sound box S. It will be noted that in the shallow form of the box S illustrated in FIGS. 5 and 6, the overall outside depth for both inlet passages 73 and the outlet passages 75 is the same, but by reason of the use of wood blocks 93, 95 and 97 in the inlets 73 the desired shorter physical lengths of these resonant chambers KK and LL are effected conveniently.

It is to be understood that while the lengths of the various resonant chambers have been made substantially equal to one full wavelength of sound of typical assumed characteristic frequencies under the conditions assumed to exist in these particular passages, alternately these lengths may be made substantially equal to half-wavelengths of sound of the characteristic frequencies, and the overall depths of these sound suppressor assemblies may thus be halved.

Referring now to FIGS. 11–14, another sound suppressor assembly of the present invention is illustrated. This assembly, indicated generally at S'', is particularly useful when the sound produced by the rotary apparatus has one predominant frequency peak or characteristic frequency (for example, where a constant spacing distance is maintained between the vanes of fins of the air moving member). Two air inlet openings for the enclosure P are indicated at 99 and a single air outlet for this enclosure is indicated at 101. Two parallel air inlet passages 103 and resonant chambers T are formed by positioning a vertical partition 105 and a horizontal divider 107 between top, bottom and end walls 109, 111 and 113. A cross wall 115 is secured to the outer edges of the walls 109, 111, 113 and another end wall 114. Cross wall 115 is provided with openings or apertures 117, and is positioned transversely relative to the direction of air flow through apertures 117 and passages 103. Wall 115 is spaced away from openings 99 a distance approximately corresponding to a wavelength (or one-half wavelength or multiple thereof) of the single predominant sound characteristic frequency to be suppressed. An air outlet passage 119 for enclosure P is provided through a chamber U formed between air outlet 101 and cross wall 115 having an opening or aperture 121. As the width of suppressor assembly is greater than the length of the enclosure P, two closure panels 123 and 125 are welded to the adjacent assembly and enclosure portions to close the rectangular gaps which would otherwise remain.

In this embodiment, the lengths of the inlet and outlet passages are shown to be equal, and this will effect substantial noise suppression at the single characteristic frequency if this length is made substantially equal to a wavelength function of this characteristic frequency (i.e., without correcting for the effects of temperature etc. in the chambers T and U). As the Q of the apparatus may not be particularly high, this approximation may be satisfactory. For even more effective noise suppression, the length of the air outlet and inlet passages may be made more precisely equal to one-half or one wavelength (or a multiple thereof) of the characteristic sound frequency considering the air velocity and temperature within the chambers T and U. Thus, the chamber U should be made sufficiently longer to equal the wavelength of this sound frequency peak in the effluent hotter air passing through outlet passage 119 while the chambers T are made shorter to equal the wavelength of this sound frequency peak being propagated against the direction of cooler entering air flowing through inlet passages 103. For even more precise calculations the temperatures in the inlet and outlet passages under typical or average operating conditions should be taken into account. Also, it will be noted that the diagonal dimensions of the resonant chambers should not be made approximately equal to the wavelength function of a sound frequency peak to be suppressed, as this would tend to reduce the efficiency of sound suppression.

It will be understood that the cross wall apertures or external openings may be connected to any desired air supply and exhaust ducts, and that these sound suppression units of this invention offer very little restriction to the passage of air or gas coolant into and out of the machine. Moreover, it has been found that sound suppressed machines of this invention may have a sound level as low as only about 1% of the sound level produced without the sound suppression system of this invention.

In view of the above, it will be seen that the several objects of the invention are accomplished, namely, the provision of an air-cooled dynamoelectric machine which for one thing has a high-handling capacity due to large air flow which is accommodated by the extended form of the surrounding plenum chamber. The plenum chamber P is preferably polygonal for accommodating in any one of several positions the rectangular suppressor box containing air outlet and inlet means. Moreover, the means for dividing the inlets and outlets into substantially resonant chambers or segments suppresses noise-forming sound level peaks such as PK and Q (FIG. 10). Also, this is done in such a way that the entire sound suppressor box S may be made in rectangular form and of simple flat sheets.

As various changes could be made in the above constructions without departing from the scope of the invention, it is intended that all matter contained in the above description or shown in the accompanying drawings shall be interpreted as illustrative and not in a limiting sense.

What is claimed is:

1. A dynamoelectric machine comprising electromagnetic induction apparatus having two relatively rotary members which generate heat during relative rotation, one of said members including means for moving air at a velocity which is a function of the rotational speed of said one member, said one member producing sound which has at least one characteristic frequency which is a function of the speed of said one member, and enclosure for said apparatus having at least one air inlet opening and at least one air outlet opening, means extending from each of said air inlet and outlet openings and forming an air inlet passage and an air outlet passage, each passage connected at one end with the enclosure and having a cross wall positioned transversely to the direction of air flow therethrough, the cross walls having apertures smaller than said respective inlet and outlet openings and axially spaced therefrom in a direction away from said enclosure and at distances substantially equal to a wavelength function of said characteristic frequency of said apparatus thereby to effect substantial cancellation of sound at said frequency and substantially reduce the noise level of said machine.

2. A dynamoelectric induction apparatus as set forth in claim 1 wherein the distance between the air inlet opening and its respective cross wall is less than the distance between said air outlet opening and its respective cross wall, each of said different distances being substantially the same wavelength function of said characteristic frequency of the sound in the air circulating through the respective passages.

3. A dynamoelectric machine comprising electromagnetic induction apparatus having two relatively rotary members which generate heat during relative rotation, one of said members including means for moving air at a velocity which is a function of the rotational speed of said one member, said one member producing sound which has at least two characteristic frequencies which are functions of the speed of said one member, an enclosure for said apparatus having at least one air inlet opening and at least one air outlet opening, means extending from said air inlet and air outlet openings respectively and forming an air inlet passage and an air outlet passage each connected at one end with the enclosure, each of the inlet and outlet passages having a first and a second cross wall positioned transversely to the direction of air flow therethrough and axially spaced different distances from the respective inlet and outlet openings in a direction away from said enclosure, the second cross wall being spaced away from the respective opening a distance greater than that between said first cross wall and the respective opening, each of said cross walls having an aperture therein, the size of the aperture in the first cross wall being smaller than that of the respective opening, the size of the aperture in the second cross wall being smaller than that of the aperture in the respective first cross wall, the spacing between one of said cross walls and the respective opening being substantially equal to a wavelength function of one of said characteristic sound frequencies thereby to effect substantial cancellation of one of said characteristic frequencies and greatly reduce the noise level of said machine.

4. A dynamoelectric machine as set forth in claim 3 in which the spacing between the other cross wall and the respective opening of each of the passages is substantially equal to a wavelength function of the other of said characteristic sound frequencies thereby to effect substantial cancellation of sound of both of said frequencies.

5. A dynamoelectric induction apparatus as set forth in claim 4 wherein the distances between the air inlet opening and the respective cross walls are each less than the respective distances between said air outlet opening and the respective cross walls, each of said different distances being substantially the same wavelength functions of said characteristic frequencies of the sound in the air circulating through the respective passages.

6. A dynamoelectric machine as set forth in claim 3 in which the spacing between two cross walls in each of said passages is substantially equal to a wavelength function of the other of said characteristic sound frequencies thereby to effect substantial cancellation of sound of both of said frequencies.

7. A dynamoelectric induction apparatus as set forth in claim 6 wherein the distances between the air inlet opening and the respective cross walls are each less than the respective distances between said air outlet opening and the respective cross walls, each of said different distances being substantially the same wavelength functions of said characteristic frequencies of the sound in the air circulating through the respective passages.

8. A dynamoelectric machine as set forth in claim 3 in which the spacing between each of the second cross walls and the respective opening is substantially equal to a wavelength function of the lower of said two characteristic frequencies, and the spacing between each of the first cross walls and the respective opening is substantially equal to a wavelength function of the higher of said two characteristic frequencies thereby to effect substantial cancellation of sound of both of said frequencies.

9. A sound suppressor assembly for an electromagnetic induction apparatus having two relatively rotary members which generate heat during relative rotation, one of said members including means for moving air at a velocity which is a function of the rotational speed of said one member, said one member producing sound which has at least one characteristic frequency which is a function of the speed of said one member, said apparatus including an enclosure having at least one air inlet opening and one air outlet opening; said sound suppressor assembly comprising means extending from each of said air inlet and air outlet openings thereby forming an air inlet passage and an air outlet passage, each passage being adapted for connection at one end with the enclosure and having a cross wall positioned transversely to the direction of air flow therethrough, the cross walls having apertures smaller than said respective inlet and outlet openings and axially spaced therefrom in a direction away from said enclosure and at distances substantially equal to a wavelength function of said characteristic frequency of said apparatus thereby to effect substantial cancellation of sound at said frequency and substantially reduce the noise level of said apparatus.

10. A sound suppressor assembly as set forth in claim 9 wherein the distance between the air inlet opening and its respective cross wall is less than the distance between said air outlet opening and its respective cross wall, each of the different distances being substantially the same wavelength function of said characteristic frequency of the sound in the air circulating through the respective passages.

11. A dynamoelectric machine comprising rotary electromagnetic induction apparatus including a sound-generating gas-coolant circulating device, a plenum chamber surrounding said apparatus, means extending from the plenum chamber forming a passage connected at one end with the plenum chamber by a first comparatively larger opening, and having a wall containing a comparatively smaller second opening axially spaced from the first opening, both of said openings having surrounding marginal portions transverse to said passage, the marginal portion of said second opening extending within the axially projected outline of the first opening, the openings of said passage carrying air moved by said circulating device and carrying sound waves moving from the larger first opening to the smaller second opening for reflection by said marginal portion of the second opening back toward the plenum chamber.

12. A dynamoelectric machine comprising rotary electromagnetic induction apparatus including a sound-generating gas-coolant circulating device, a plenum chamber surrounding said apparatus, means extending from the plenum chamber forming a passage connected at one end with the plenum chamber by a first comparatively larger opening, said means having an outer end wall containing a comparatively smaller second opening axially spaced from the first opening and having an intermediate cross wall containing a third opening of intermediate size, all of said openings having surrounding marginal portions transverse to said passage, the marginal portion of said second opening extending within the axially projected outline of the intermediate opening, the marginal portion of the intermediate opening extending within the projected outline of the first opening, the opening of said passage carrying air moved by said circulating device and carrying sound waves moving from the larger first opening to the intermediate and second openings for reflection by said marginal portions of the intermediate and second openings back toward the plenum chamber.

13. A dynamoelectric machine comprising rotary electromagnetic induction apparatus including a sound-generating gas-coolant circulating device, a plenum chamber surrounding said apparatus, means extending from the plenum chamber forming passages, each passage connected at one end with the plenum chamber by a first comparatively larger opening, and having a wall containing a comparatively smaller second opening axially spaced from the first opening, both openings in each passage having surrounding marginal portions transverse to the passage, the marginal portion of said second opening extending within the axially projected outline of the first opening, the openings of one of said passages carrying air to the plenum chamber, the openings of the other passage carrying air from the plenum chamber, each of said passages carrying sound waves moving from its larger first opening to its smaller second opening for reflection by said marginal portion of the second opening back toward the plenum chamber.

14. A dynamoelectric machine comprising rotary electromagnetic induction apparatus including a sound-generating gas-coolant circulating device, a plenum chamber surrounding said apparatus, means extending from the plenum chamber forming passages, each passage connected at one end with the plenum chamber by a first comparatively larger opening and having a wall containing a comparatively smaller second opening axially spaced from the first opening and having an intermediate cross wall containing a third opening of intermediate size, all of said openings having surrounding marginal portions transverse to said passage, the marginal portion of said second opening extending within the axially projected outline of the intermediate opening, the marginal portion of the intermediate opening extending within the projected outline of the first opening, the openings of one of said passages carrying air to the plenum chamber, the openings of the other passage carrying air from the plenum chamber, each of said passages carrying sound waves moving from its larger first opening to its intermediate and second openings for reflection by said marginal portions of the second and intermediate openings back toward the plenum chamber.

15. A dynamoelectric machine comprising rotary electromagnetic induction apparatus including sound-generating gas-coolant circulating means, a plenum chamber surrounding said means, a sound suppressor assembly, said assembly having an outer wall and an inner wall, the latter comprising a portion of the wall of the plenum chamber, said assembly being formed with at least one air inlet passage and at least one air outlet passage, each passage extending from said outer wall to said inner wall, each passage also including an intermediate cross wall dividing it into sections, the inner wall, intermediate cross wall and outer wall in each passage having axially related openings of respectively progressively smaller areas through which air is moved into and forced out of the plenum chamber through said inlet and outlet passages respectively while sound moves out from the plenum chamber through both passages for reflection from the margins of the outer and intermediate openings toward the plenum chamber.

16. A dynamoelectric machine made according to claim 15, wherein said sections into which said passages are divided by their cross walls are of unequal lengths.

17. A dynamoelectric machine comprising rotary electromagnetic apparatus including a sound-generating gas-coolant circulating device, a polygonal plenum chamber surrounding said apparatus constructed to provide an opening on one side or another thereof for attachment thereat of a sound suppressor assembly, a sound suppressor assembly in the form of a box having an outer wall and an inner wall, the latter forming a closure for said opening of the plenum chamber, said assembly having several air inlet passages and several air outlet passages, each passage extending from said outer wall to said inner wall, each passage also including an intermediate wall dividing it into unequal sections, said inner wall, intermediate wall and outer wall having aligned openings with progressively smaller areas in that order through which air is drawn into and forced out of the plenum chamber through said inlet and outlet passages respectively, the inner margins of the openings in the intermediate wall and the outer wall forming sound-reflecting means for substantially reducing noise by sound waves moving outwardly through the passages.

18. A dynamoelectric machine made according to claim 17, wherein said plenum chamber, said assembly, said passages and the openings are all of rectangular form.

19. A dynamoelectric machine comprising rotary electromagnetic apparatus including a gas-coolant circulating device producing sounds including those substantially at one frequency peak, a plenum chamber surrounding said apparatus, coolant-passage-forming means extending from the plenum chamber, said passage-forming means terminating at one end in a wall forming part of the plenum chamber, said chamber having a second wall, openings in the walls, the opening in the wall forming part of the plenum chamber being larger than the other opening, the length of the passage-forming means between said walls being approximately equal to a wavelength function of said frequency peak of the sound generated by said induction apparatus.

20. A dynamoelectric machine comprising rotary electromagnetic apparatus including a gas-coolant circulating device producing sounds including those substantially at two frequency peaks, a plenum chamber surrounding said apparatus, coolant-passage-forming means extending from the plenum chamber, said passage-forming means terminating at one end in a first inner wall forming part of the plenum chamber, said chamber terminating at its other end in a third outer wall and having a second intermediate wall, openings in the first, second and third walls which are progressively smaller in that order, the intermediate wall determining lengths in the passage-forming means between two pairs of the walls approximately equal to wavelength functions of said two frequency peaks of sound generated by said induction apparatus.

21. A dynamoelectric machine comprising rotary electromagnetic apparatus including a gas-coolant circulating device producing sounds including those substantially at two frequency peaks, a plenum chamber surrounding said apparatus, coolant-passage-forming means extending from the plenum chamber, said passage-forming means terminating at one end in an inner end wall forming part of the plenum chamber, said chamber terminating at its other end in an outer end wall and having an intermediate wall, openings in the inner end wall, intermediate wall and the outer end wall which are progressively smaller in that order, the distance between the intermediate wall and one of the end walls being approximately equal to a wavelength function of one of said frequency peaks of sound generated by said apparatus, and the distance between the inner and outer end walls being approximately equal to a wavelength function of the other of said frequency peaks of sound generated by said apparatus.

22. A dynamoelectric machine comprising rotary electromagnetic apparatus including a gas-coolant circulating device producing sounds including those substantially at two frequency peaks, a plenum chamber surrounding said apparatus, coolant passage-forming means extending from the plenum chamber, said passage-forming means terminating at one end in a first inner wall forming part of the plenum chamber, said chamber terminating at its other end in a third outer wall and having a second intermediate wall, openings in the first, second and third walls which are progressively smaller in that order, the distance between the intermediate wall and the first wall being approximately equal to a wavelength function of the higher frequency one of said peaks of sound generated by said induction apparatus, and the distance between the inner and outer end walls being approximately equal to a wavelength function of the lower frequency one of said peaks of sound generated by said apparatus.

23. A dynamoelectric machine comprising rotary electromagnetic apparatus including a gas-coolant circulating device producing sounds including those substantially at two frequency peaks, a plenum chamber surrounding said apparatus, coolant-passage-forming means extending from the plenum chamber, said passage-forming means terminating at one end in a first inner wall forming part of the plenum chamber, said chamber terminating at its other end in a third outer wall and having a second intermediate wall, openings in the first, second and third walls which are progressively smaller in that order, the distance between the intermediate wall and one end wall being approximately equal to a wavelength function of one of said frequency peaks of sound generated by said induction apparatus, and the distance between said intermediate wall and the other end wall being approximately equal to a wavelength function of the other of said frequency peaks of sound generated by said apparatus.

24. A dynamoelectric machine comprising rotary electromagnetic apparatus including a sound-generating gas-coolant circulating device producing sound, a plenum chamber surrounding said apparatus, a sound suppressor assembly attached to said plenum chamber, said assembly comprising a substantially rectangularly formed box interiorly divided by substantially rectangularly formed walls and shelves dividing the box into at least one gas inlet passage and at least one gas outlet passage, each passage having an interior opening communicating through an inside wall with the plenum chamber through an intermediate wall in the passage and through an outside wall of the box, the sizes of the openings in the inside, intermediate and outside walls decreasing in area in that order.

25. Dynamoelectric apparatus according to claim 24, wherein said openings are of rectangular form.

26. A dynamoelectric machine comprising rotary electromagnetic apparatus including a sound-generating gas-coolant circulating device producing sound, a plenum chamber surrounding said apparatus, a sound suppressor assembly attached to said plenum chamber, said assembly comprising a substantially rectangular formed box interiorly divided by substantially rectangularly formed walls and shelves to form several rectangular gas inlet passages and several rectangular gas outlet passages, each passage having an interior opening communicating with the plenum chamber, an opening in an intermediate wall, and an opening in an outlet wall of the box, the sizes of the openings in the interior, intermediate and outlet openings decreasing in area.

27. Dynamoelectric apparatus according to claim 26, wherein each of said openings is rectangular.

28. A dynamoelectric machine comprising rotary electromagnetic apparatus including a sound-generating gas-coolant circulating device producing sound, a substantially rectangular plenum chamber surrounding said apparatus, a sound suppressor assembly in the form of a box attached on one of its sides to a side of said plenum chamber, said assembly being interiorly divided by substantially rectangularly formed walls and shelves dividing the box into several rectangular gas inlet passages and several rectangular gas outlet passages, each passage being segmented by a cross wall, each passage having an inner rectangular opening communicating with the plenum chamber, an intermidate rectangular opening in its cross wall and a rectangular outer opening in an outlet wall of the box, the areas of the inner, intermediate and outside openings decreasing in that order.

References Cited

UNITED STATES PATENTS 2,324,297  7/1943  Grobel _____ 310—57
3,171,996  3/1965  Alger et al. _____ 310—51

ROBERT K. SCHAEFER, *Primary Examiner.*

H. O. JONES, *Assistant Examiner.*